(12) United States Patent
Iseki et al.

(10) Patent No.: US 8,883,922 B2
(45) Date of Patent: Nov. 11, 2014

(54) PRESSURE-SENSITIVE ADHESIVE COMPOSITIONS, PRESSURE-SENSITIVE ADHESIVE LAYERS, AND PRESSURE-SENSITIVE ADHESIVE SHEETS

(71) Applicant: Nitto Denko Corporation, Ibaraki (JP)

(72) Inventors: Toru Iseki, Ibaraki (JP); Keisuke Hirano, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/719,917

(22) Filed: Dec. 19, 2012

(65) Prior Publication Data

US 2013/0158199 A1 Jun. 20, 2013

(30) Foreign Application Priority Data

Dec. 20, 2011 (JP) ................................. 2011-278268
May 28, 2012 (JP) ................................. 2012-120949

(51) Int. Cl.
*C09J 133/14* (2006.01)

(52) U.S. Cl.
CPC ..................................... *C09J 133/14* (2013.01)
USPC .......................................... 525/123; 525/453

(58) Field of Classification Search
USPC ................................................. 525/123, 453
See application file for complete search history.

(56) References Cited

U.S. PATENT DOCUMENTS 4,871,854 A * 10/1989 Oberth et al. ..................... 546/7
2013/0266805 A1 10/2013 Kataoka et al.

FOREIGN PATENT DOCUMENTS

| JP | 63130686 A * | 6/1988 |
| JP | 09-165460 | 6/1997 |
| JP | 2002-038119 | 6/2002 |
| JP | 2005-314513 | 11/2005 |
| JP | 2008-013634 | 1/2008 |
| JP | 2010-217227 | 9/2010 |

OTHER PUBLICATIONS

Extended European Search Report dated Apr. 25, 2013 in corresponding patent application No. 12197508.0.

* cited by examiner

*Primary Examiner* — Mike M Dollinger
(74) *Attorney, Agent, or Firm* — Knobbe, Martens, Olson & Bear LLP

(57) ABSTRACT

Provided are a pressure-sensitive adhesive composition that is produced with no tin compound, has a sufficiently long pot life, and can be rapidly crosslinked in the process of forming a pressure-sensitive adhesive layer; and a pressure-sensitive adhesive layer and a pressure-sensitive adhesive sheet each produced using such a pressure-sensitive adhesive composition. A pressure-sensitive adhesive composition, comprising: 100 parts by weight of an acrylic polymer (A) having an active hydrogen-containing functional group; 0.1 parts by weight to 10 parts by weight of an isocyanate crosslinking agent (B); 0.002 parts by weight to 0.5 parts by weight of a catalyst (C) having an iron active center; and a compound (D) capable of undergoing keto-enol tautomerism, wherein the weight ratio (D/C) of the compound (D) capable of undergoing keto-enol tautomerism to the catalyst (C) having an iron active center is from 3 to 70.

13 Claims, No Drawings

PRESSURE-SENSITIVE ADHESIVE COMPOSITIONS, PRESSURE-SENSITIVE ADHESIVE LAYERS, AND PRESSURE-SENSITIVE ADHESIVE SHEETS

BACKGROUND OF THE INVENTION

1. Field of the Invention

The invention relates to a pressure-sensitive adhesive composition, a pressure-sensitive adhesive layer, and a pressure-sensitive adhesive sheet. More specifically, the invention relates to an acrylic pressure-sensitive adhesive composition having a long pot life, a pressure-sensitive adhesive layer produced by crosslinking the composition, and a pressure-sensitive adhesive sheet including a support and such a pressure-sensitive adhesive layer formed on the support.

2. Description of the Related Art

Pressure-sensitive adhesive sheets are now increasingly being used in a variety of processes, such as fixing (bonding), transporting, protecting, and decorating of articles. Typical examples of such pressure-sensitive adhesive sheets have a pressure-sensitive adhesive layer that is formed using a pressure-sensitive adhesive composition containing an acrylic polymer as a base polymer (an acrylic pressure-sensitive adhesive composition). Such an acrylic polymer is usually a copolymer of an alkyl(meth)acrylate (a main component) and another monomer having a suitable functional group. Such an acrylic polymer having a functional group is mixed with a crosslinking agent reactive with the functional group, so that a pressure-sensitive adhesive composition is obtained. A pressure-sensitive adhesive layer is formed by crosslinking the acrylic polymer.

Removable acrylic pressure-sensitive adhesive sheets are used for surface protection, masking tapes, electrical and electronic devices, optical films, automobiles, etc. If the cohesive strength of the pressure-sensitive adhesive layer is insufficient in such removable acrylic pressure-sensitive adhesive sheets, a problem will occur in which the pressure-sensitive adhesive forms a residue on the surface of the adherend during the removal of the sheets. To solve this problem, the pressure-sensitive adhesive layer is required to have high cohesive strength and thus to be highly crosslinked. On the other hand, crosslinking, which is a chemical reaction, proceeds with time and needs a time period to be stabilized. The adhesive strength also changes as the crosslinking proceeds. This means that the crosslinking reaction should be completed at an early stage. Thus, for example, when an acrylic copolymer having a hydroxyl group is combined with an isocyanate crosslinking agent, a metal catalyst such as a tin compound is used (see JP-A-2005-314513). Unfortunately, in view of environmental issues these days, there have been concerns or regulations on the use of specific metals.

A pressure-sensitive adhesive composition for use in forming a pressure-sensitive adhesive layer is sometimes stored for a certain period of time depending on the production planning, and at the storage stage, the pressure-sensitive adhesive composition may be crosslinked. If crosslinking proceeds during the storage of the pressure-sensitive adhesive composition, the composition can increase in viscosity or form an insoluble product, which will cause roughening of the surface or variations in the thickness of a pressure-sensitive adhesive layer being formed subsequently. This may also affect the adhesive properties. Thus, there has been a demand for a pressure-sensitive adhesive composition that does not undergo crosslinking during storage, has a sufficiently-long useful life, called "pot life," and can be rapidly crosslinked in the process forming a pressure-sensitive adhesive layer.

SUMMARY OF THE INVENTION

Problem to be Solved by the Invention

To solve problems with conventional acrylic pressure-sensitive adhesives, it is an object of the invention to provide a pressure-sensitive adhesive composition that is produced with no tin compound, has a sufficiently long pot life, and can be rapidly crosslinked in the process of forming a pressure-sensitive adhesive layer; and a pressure-sensitive adhesive layer and a pressure-sensitive adhesive sheet each produced using the pressure-sensitive adhesive composition.

Means for Solving the Problems

As a result of earnest study of monomers used to form the main component of a base polymer, the inventors have accomplished the invention based on the finding that when an iron catalyst and a specific amount of a compound capable of undergoing keto-enol tautomerism are used together in a pressure-sensitive adhesive composition containing an acrylic polymer having an active hydrogen-containing functional group and an isocyanate crosslinking agent with which the acrylic polymer is crosslinkable, the resulting pressure-sensitive adhesive composition does not undergo crosslinking during storage and thus has a sufficiently long pot life, and can also rapidly undergo a crosslinking reaction in the process of forming a pressure-sensitive adhesive layer.

Specifically, the invention provides a pressure-sensitive adhesive composition including 100 parts by weight of an acrylic polymer (A) having an active hydrogen-containing functional group, 0.1 parts by weight to 10 parts by weight of an isocyanate crosslinking agent (B), 0.002 parts by weight to 0.5 parts by weight of a catalyst (C) having an iron active center, and a compound (D) capable of undergoing keto-enol tautomerism, wherein the weight ratio (D/C) of the compound (D) capable of undergoing keto-enol tautomerism to the catalyst (C) having an iron active center is from 3 to 70.

Specifically, in the pressure-sensitive adhesive composition of the invention, the acrylic polymer (A) having an active hydrogen-containing functional group preferably includes, as monomer components, 70% by weight to 99.9% by weight of an alkyl(meth)acrylate having an alkyl group of 4 to 12 carbon atoms and 0.1% by weight to 30% by weight of a monomer having an active hydrogen-containing functional group.

In addition, in the pressure-sensitive adhesive composition of the invention, the catalyst (C) having an iron active center is preferably an iron chelate compound, the compound (D) capable of undergoing keto-enol tautomerism is preferably a β-diketone.

In addition, in the pressure-sensitive adhesive composition of the invention, the pressure-sensitive adhesive composition has a gel fraction of 80% or more after crosslinked.

In addition, the invention provides a pressure-sensitive adhesive layer comprising a product of crosslinking of the pressure-sensitive adhesive composition.

In addition, the invention provides a pressure-sensitive adhesive sheet comprising a support and the pressure-sensitive adhesive layer according to claim 6 formed on the support.

Effect of the Invention

The pressure-sensitive adhesive composition of the invention does not undergo a crosslinking reaction during storage and thus has a sufficiently long pot life, and can also rapidly undergo a crosslinking reaction in the process of forming a pressure-sensitive adhesive layer. Thus, the pressure-sensitive adhesive composition can be stored for a certain period of time and enables flexible production planning. The pressure-sensitive adhesive sheet produced with the pressure-sensitive adhesive composition has rapidly undergone crosslinking, which stabilizes the properties. Thus, the pressure-sensitive adhesive composition has advantages such as no need for aging or post-crosslinking and prevention of external pressure-induced deformation, scratching, or other damages to the pressure-sensitive adhesive sheet, which would otherwise occur during production or storage.

DETAILED DESCRIPTION OF THE PREFERRED EMBODIMENTS

Hereinafter, preferred embodiments of the invention are described in detail. The pressure-sensitive adhesive composition of the invention includes 100 parts by weight of an acrylic polymer (A) having an active hydrogen-containing functional group, 0.1 to 10 parts by weight of an isocyanate crosslinking agent (B), 0.002 to 0.5 parts by weight of a catalyst (C) having an iron active center, and a compound (D) capable of undergoing keto-enol tautomerism, wherein the weight ratio (D/C) of the compound (D) capable of undergoing keto-enol tautomerism to the catalyst (C) having an iron active center is from 3 to 70.

Acrylic Polymer (A) Having Active Hydrogen-Containing Functional Group

The pressure-sensitive adhesive composition of the invention contains an acrylic polymer (A) having an active hydrogen-containing functional group. The acrylic polymer (A) having an active hydrogen-containing functional group is an acrylic polymer having an active hydrogen-containing functional group, such as a hydroxyl group or a carboxyl group, on its main or side chain, in which the active hydrogen-containing functional group is capable of reacting with the isocyanate crosslinking agent (B) described below. The acrylic polymer (A) having such an active hydrogen-containing functional group can be obtained by copolymerization of at least an alkyl(meth)acrylate as a main component and a monomer having an active hydrogen-containing functional group as a monomer component (hereinafter also referred to as an "active hydrogen-containing functional monomer").

In the invention, the acrylic polymer (A) having an active hydrogen-containing functional group may include an alkyl (meth)acrylate as a main monomer component. Such an alkyl (meth)acrylate preferably has an alkyl group of 4 to 12 carbon atoms. Examples of such an alkyl(meth)acrylate include butyl(meth)acrylate, isobutyl(meth)acrylate, tert-butyl (meth)acrylate, pentyl(meth)acrylate, amyl(meth)acrylate, isoamyl(meth)acrylate, hexyl(meth)acrylate, heptyl(meth) acrylate, octyl(meth)acrylate, isooctyl(meth)acrylate, 2-ethylhexyl(meth)acrylate, nonyl(meth)acrylate, isononyl(meth) acrylate, decyl(meth)acrylate, isodecyl(meth)acrylate, undecyl(meth)acrylate, dodecyl(meth)acrylate, etc.

These alkyl(meth)acrylates having an alkyl group of 4 to 12 carbon atoms may be used alone or in any combination. The total content of one or more of these alkyl(meth)acrylates is preferably from 70 to 99.9% by weight, more preferably from 80 to 99% by weight, even more preferably from 85 to 99% by weight, based on the weight of all monomers. If the content of the alkyl(meth)acrylate(s) is less than 70% by weight, the content of the functional group-containing monomer or other monomers described below will be relatively high, which may cause the acrylic polymer to have a relatively high glass transition temperature and relatively low fluidity, so that the adhesive area may be insufficient to fix an article.

In addition, the degree of crosslinking (gel fraction) may be difficult to control. If the content of the alkyl(meth)acrylate(s) is more than 99.9% by weight, the content of the functional group-containing monomer will be relatively low, which can make the crosslinkage insufficient, so that the pressure-sensitive adhesive composition cannot provide cohesive strength in some cases.

In the invention, the active hydrogen-containing functional monomer to be used has an active hydrogen-containing functional group, such as a hydroxyl group or a carboxyl group, which is capable of reacting with the crosslinking agent such as an isocyanate compound. Examples of the active hydrogen-containing functional monomer include hydroxyl group-containing monomers including hydroxyalkyl(meth)acrylates such as 2-hydroxyethyl(meth)acrylate, 2-hydroxypropyl(meth)acrylate, 3-hydroxypropyl(meth) acrylate, 2-hydroxybutyl(meth)acrylate, 4-hydroxybutyl (meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, and [4-(hydroxymethyl) cyclohexyl]methyl acrylate.

Other examples of the active hydrogen-containing functional monomer include carboxyl group-containing monomers such as (meth)acrylic acid, itaconic acid, and maleic acid; and N-hydroxyalkyl(meth)acrylamides such as N-methylolacrylamide, N-methylolmethacrylamide, N-(2-hydroxyethyl)acrylamide, N-(2-hydroxyethyl)methacrylamide, N-(2-hydroxypropyl)acrylamide, N-(2-hydroxypropyl)methacrylamide, N-(1-hydroxypropyl) acrylamide, N-(1-hydroxypropyl)methacrylamide, N-(3-hydroxypropyl)acrylamide, N-(3-hydroxypropyl) methacrylamide, N-(2-hydroxybutyl)acrylamide, N-(2-hydroxybutyl)methacrylamide, N-(3-hydroxybutyl) acrylamide, N-(3-hydroxybutyl)methacrylamide, N-(4-hydroxybutyl)acrylamide, and N-(4-hydroxybutyl) methacrylamide.

These active hydrogen-containing functional monomers may be used alone or in any combination. The total content of one or more of these active hydrogen-containing functional monomers is preferably from 0.1 to 30% by weight, more preferably from 1 to 20% by weight, even more preferably from 2 to 15% by weight, based on the weight of all monomers. If the content of the active hydrogen-containing functional monomer is less than 0.1% by weight, crosslinkage can be insufficient to enable the pressure-sensitive adhesive composition to provide cohesive strength, which may cause the pressure-sensitive adhesive sheet to be misaligned during the fixing of an article or may cause an adhesive residue when the pressure-sensitive adhesive sheet is peeled off. If the content of the active hydrogen-containing functional monomer is more than 30% by weight, the acrylic polymer may have higher cohesive strength and thus have lower fluidity, so that the adhesive area may be insufficient to fix an article.

In the invention, any other monomer may be used in addition to the alkyl(meth)acrylate having an alkyl group of 4 to 12 carbon atoms and the active hydrogen-containing functional monomer as a monomer component. Such any other monomer may be an alkyl(meth)acrylate having an alkyl group in which the number of carbon atoms is not between 4 and 12. Examples of the alkyl(meth)acrylate, which may be used in the invention, having an alkyl group in which the number of carbon atoms is not between 4 to 12, include methyl(meth)acrylate, ethyl(meth)acrylate, propyl(meth) acrylate, isopropyl(meth)acrylate, tridecyl(meth)acrylate, tetradecyl(meth)acrylate, pentadecyl(meth)acrylate, hexadecyl(meth)acrylate, heptadecyl(meth)acrylate, octadecyl(meth)acrylate, nonadecyl(meth)acrylate, and eicosyl(meth)acrylate.

Examples of any other monomer that may be used in the invention also include cyclic (meth)acrylamides such as N-(meth)acryloylmorpholine and N-acryloyl pyrrolidine; noncyclic (meth)acrylamides such as (meth)acrylamide and N-substituted (meth)acrylamides (e.g., N-alkyl(meth)acrylamides such as N-ethyl(meth)acrylamide, N-n-butyl(meth)acrylamide; and N,N-dialkyl(meth)acrylamides such as N,N-dimethyl(meth)acrylamide, N,N-diethyl(meth)acrylamide, N,N-dipropyl(meth)acrylamide, N,N-diisopropyl(meth)acrylamide, N,N-di(n-butyl)(meth)acrylamide, and N,N-di(tert-butyl)(meth)acrylamide; N-vinyl cyclic amides such as N-vinyl-2-pyrrolidone, N-vinyl-2-piperidone, N-vinyl-3-morpholinone, N-vinyl-2-caprolactam, N-vinyl-1,3-oxazine-2-one, and N-vinyl-3,5-morpholinedione; amino group-containing monomers such as aminoethyl(meth)acrylate, N,N-dimethylaminoethyl(meth)acrylate, and N,N-dimethylaminopropyl(meth)acrylate; maleimide skeleton-containing monomers such as N-cyclohexylmaleimide and N-phenylmaleimide; itaconimide monomers such as N-methylitaconimide, N-ethylitaconimide, N-butylitaconimide, N-2-ethylhexylitaconimide, N-laurylitaconimide, and N-cyclohexylitaconimide; and other nitrogen atom-containing monomers.

Other monomers that may be employed include epoxy group-containing monomers such as glycidyl(meth)acrylate and allyl glycidyl ether; alkoxy group-containing monomers such as methoxyethyl(meth)acrylate, methoxypropyl(meth)acrylate, methoxyethylene glycol(meth)acrylate, and methoxypolypropylene glycol(meth)acrylate; cyano group-containing monomers such as acrylonitrile and methacrylonitrile; styrene monomers such as styrene and α-methylstyrene; α-olefins such as ethylene, propylene, isoprene, butadiene, and isobutylene; isocyanate group-containing monomers such as 2-methacryloyloxyethyl isocyanate; vinylester monomers such as vinyl acetate and vinyl propionate; vinylether monomers such as vinyl ether; heterocyclic ring-containing (meth)acrylic esters such as tetrahydrofurfuryl(meth)acrylate; halogen atom-containing monomers such as fluoro(meth)acrylate; alkoxysilyl group-containing monomers such as 3-methacryloxypropyltrimethoxysilane and vinyltrimethoxysilane; siloxane bond-containing monomers such as silicone (meth)acrylate; alicyclic hydrocarbon group-containing (meth)acrylates such as cyclopentyl(meth)acrylate, cyclohexyl(meth)acrylate, bornyl(meth)acrylate, and isobornyl(meth)acrylate; and aromatic hydrocarbon group-containing (meth)acrylates such as phenyl(meth)acrylate, benzyl(meth)acrylate, phenoxyethyl(meth)acrylate, and phenoxydiethylene glycol(meth)acrylate.

Examples of other monomers that may also be used include polyfunctional monomers such as ethylene glycol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, neopentyl glycol di(meth)acrylate, hexanediol di(meth)acrylate, pentaerythritol di(meth)acrylate, trimethylolpropane tri(meth)acrylate, pentaerythritol tri(meth)acrylate, dipentaerythritol hexa(meth)acrylate, epoxyacrylate, polyester acrylate, urethane acrylate, divinylbenzene, butyl di(meth)acrylate, and hexyl di(meth)acrylate.

These other monomers may be used alone or in any combination. The total content of one or more of these other monomers is preferably 29.9% by weight or less, more preferably 19% by weight or less, and even more preferably 13% by weight or less, based on the weight of all monomers. If the content of other monomers is more than 29.9% by weight, the content of the alkyl(meth)acrylate having an alkyl group of 4 to 12 carbon atoms will be relatively low, which may cause the acrylic polymer to have a relatively high transition temperature and relatively low fluidity, so that the adhesive area may be insufficient to fix an article.

The acrylic polymer used in the invention preferably has a weight average molecular weight of 100,000 to 3,000,000, more preferably 200,000 to 2,000,000, and even more preferably 300,000 to 1,500,000. If the weight average molecular weight is less than 100,000, the pressure-sensitive adhesive layer may tend to have lower cohesive strength, which may cause the pressure-sensitive adhesive sheet to be misaligned during the fixing of an article or may cause an adhesive residue when the pressure-sensitive adhesive sheet is peeled off. On the other hand, if the weight average molecular weight is more than 3,000,000, the polymer may have higher cohesive strength and lower fluidity due to polymer entanglement effect, so that the adhesive area may be insufficient to fix an article. In the invention, the weight average molecular weight of the acrylic polymer may be a standard polystyrene-equivalent weight average molecular weight obtained by gel permeation chromatography (GPC) measurement.

The acrylic polymer used in the invention preferably has a glass transition temperature (Tg) of 0° C. or less (and generally −100° C. or more), more preferably −10° C. or less, and even more preferably −20° C. or less. If the glass transition temperature is more than 0° C., the polymer may have higher cohesive strength and lower fluidity, so that the adhesive area may be insufficient to fix an article. The glass transition temperature of the acrylic polymer can be adjusted within the above range by appropriately changing the monomers to be used or changing the monomer composition ratio. In the invention, the glass transition temperature of the acrylic polymer can be determined by a measurement method using a dynamic viscoelastometer or by calculation using the Fox equation.

The acrylic polymer used in the invention can be produced by any known polymerization method such as solution polymerization, emulsion polymerization, bulk polymerization, or suspension polymerization. The resulting copolymer may be any of a random copolymer and a block copolymer.

Isocyanate Crosslinking Agent (B)

The pressure-sensitive adhesive composition of the invention contains an isocyanate crosslinking agent (B). Examples of the isocyanate crosslinking agent (B) include lower aliphatic polyisocyanates such as butylene diisocyanate and hexamethylene diisocyanate; alicyclic isocyanates such as cyclopentylene diisocyanate, cyclohexylene diisocyanate, and isophorone diisocyanate; aromatic isocyanates such as 2,4-tolylene diisocyanate, 4,4'-diphenylmethane diisocyanate, and xylylene diisocyanate; and isocyanate adducts such as a trimethylolpropane-tolylene diisocyanate trimer adduct (CORONATE L (trade name) manufactured by NIPPON POLYURETHANE INDUSTRY CO., LTD.), a trimethylolpropane-hexamethylene diisocyanate trimer adduct (CORONATE HL (trade name) manufactured by NIPPON POLYURETHANE INDUSTRY CO., LTD.), and an isocyanurate of hexamethylene diisocyanate (CORONATE HX (trade name) manufactured by NIPPON POLYURETHANE INDUSTRY CO., LTD.). These compounds may be used alone or in any combination.

In the invention, the content of the isocyanate crosslinking agent (B) is from 0.1 to 10 parts by weight, preferably from 1 to 10 parts by weight, more preferably from 2 to 9 parts by weight, and even more preferably from 3 to 6 parts by weight, based on 100 parts by weight of the acrylic polymer (A). If the content of the isocyanate crosslinking agent (B) is less than 0.1 parts by weight, crosslinkage can be insufficient to enable the pressure-sensitive adhesive layer to have cohesive strength, which can cause the pressure-sensitive adhesive sheet to be misaligned during the fixing of an article or can cause an adhesive residue when the pressure-sensitive adhesive sheet is peeled off. On the other hand, if the content of the isocyanate crosslinking agent (B) is more than 10 parts by weight, crosslinking can proceed excessively to increase cohesive strength and thus to reduce fluidity, so that the adhesive area can be insufficient to fix an article.

Besides the isocyanate crosslinking agent, the pressure-sensitive adhesive composition of the invention may contain any other crosslinking agent if necessary. Examples of any other crosslinking agent that may be used include epoxy crosslinking agents, melamine resins, aziridine derivatives, and metal chelate compounds. These compounds may be used alone or in any combination.

Examples of the epoxy compound include N,N,N',N'-tetraglycidyl-m-xylenediamine (trade name: TETRAD-X, manufactured by MITSUBISHI GAS CHEMICAL COMPANY, INC.), 1,3-bis(N,N-diglycidylaminomethyl)cyclohexane (trade name: TETRAD-C, manufactured by MITSUBISHI GAS CHEMICAL COMPANY, INC.) and the like. These compounds may be used alone, or two or more kinds of them may be used in combination.

Examples of the melamine-based resin include hexamethylolmelamine and the like. Examples of the aziridine derivative include a commercially available product under the trade name of HDU (manufactured by Sogo Pharmaceutical Co., Ltd.), a commercially available product under the trade name of TAZM (manufactured by Sogo Pharmaceutical Co., Ltd.), a commercially available product under the trade name of TAZO (manufactured by Sogo Pharmaceutical Co., Ltd.) and the like. These compounds may be used alone, or two or more kinds of them may be used in combination.

Examples of the metal chelate compound include aluminum, titanium, nickel, zirconium and the like as metal components; and acetylene, methyl acetoacetate, ethyl acetoacetate, ethyl lactate, acetylacetone and the like as chelate components. These compounds may be used alone, or two or more kinds of them may be used in combination.

Together with the isocyanate crosslinking agent (B), any of these other crosslinking agents may be used in any amount as long as the effects of the invention are not impaired. Based on 100 parts by weight of the acrylic polymer (A), the total amount of the isocyanate crosslinking agent (B) and any of these other crosslinking agents is preferably from 0.1 to 10 parts by weight, more preferably from 1 to 10 parts by weight, even more preferably from 2 to 9 parts by weight, particularly preferably from 3 to 6 parts by weight.

After crosslinked with the crosslinking agent, the pressure-sensitive adhesive composition of the invention preferably has a gel fraction of 80% by weight or more, more preferably 85% by weight or more, and even more preferably 90% by weight or more (and generally 98% by weight or less). If the gel fraction is less than 80% by weight, the pressure-sensitive adhesive layer may have lower cohesive strength, which may cause the pressure-sensitive adhesive sheet to be misaligned during the fixing of an article or may cause an adhesive residue when the pressure-sensitive adhesive sheet is peeled off. On the other hand, if the gel fraction is more than 98% by weight, the acrylic polymer may have higher cohesive strength and thus lower fluidity, so that the adhesive area may be insufficient to fix an article.

To achieve such a gel fraction, it is preferable to adjust the amount of the crosslinking agent and the amount of the active hydrogen-containing functional group in the acrylic polymer (A). More specifically, the amount a (mol) of active hydrogen-containing functional groups in the acrylic polymer (A) and the amount b (mol) of isocyanate groups in the isocyanate crosslinking agent (B) are each preferably adjusted so that the ratio (a/b) is from 0.01 to 42. The ratio (a/b) is more preferably from 0.1 to 14, and even more preferably from 0.4 to 7. The amount a (mol) of active hydrogen-containing functional groups in the acrylic polymer (A) and the amount b (mol) of isocyanate groups in the isocyanate crosslinking agent (B) can be calculated from Formulae (1) and (2) below.

(1) The amount a (mol) of active hydrogen-containing functional groups in M parts by weight (generally normalized as 100 in the calculation) of the acrylic polymer (A)=[M×(the content of the active hydrogen-containing monomer in the acrylic polymer (A))×(the number of active hydrogen functional groups per mole of the active hydrogen-containing monomer)]/(the molecular weight of the active hydrogen-containing monomer)

(2) The amount b (mol) of isocyanate groups in N parts by weight of the isocyanate crosslinking agent (B)=[N×(the number of isocyanate groups per mole)]/(the molecular weight of the crosslinking agent)

In the invention, the gel fraction is calculated from the equation: gel fraction=$(W_2/W_1) \times 100$ (% by weight), using $W_1$ and $W_2$ measured as described below. The pressure-sensitive adhesive layer $W_1$ g (about 0.1 g) is weighed and immersed in ethyl acetate at about 25° C. for one week. The residue of the pressure-sensitive adhesive layer is then taken out of the ethyl acetate. After the residue is dried at 130° C. for 2 hours, the weight $W_2$ g of the residue is measured.

Catalyst (C) Having Iron Active Center

The pressure-sensitive adhesive composition of the invention contains a catalyst (C) having an iron active center (hereinafter also referred to as an "iron catalyst (C)"). The iron catalyst (C) to be used is preferably an iron chelate compound, for example, which may be represented by the general formula Fe(X)(Y)(Z). Such an iron chelate compound may be represented by any one of $Fe(X)_3$, $Fe(X)_2(Y)$, $Fe(X)(Y)_2$, and Fe(X)(Y)(Z) depending on the combination between (X), (Y), and (Z). In the iron chelate compound represented by Fe(X)(Y)(Z), (X), (Y), and (Z) each represent a ligand for Fe. For example, (X), (Y), or (Z) may be a β-diketone, examples of which include acetyl acetone, hexane-2,4-dione, heptane-2,4-dione, heptane-3,5-dione, 5-methyl-hexane-2,4-dione, octane-2,4-dione, 6-methylheptane-2,4-dione, 2,6-dimethylheptane-3,5-dione, nonane-2,4-dione, nonane-4,6-dione, 2,2,6,6-tetramethylheptane-3,5-dione, tridecane-6,8-dione, 1-phenyl-butane-1,3-dione, hexafluoroacetyl acetone, and ascorbic acid.

X, Y, or Z may be a β-ketoester, examples of which include methyl acetoacetate, ethyl acetoacetate, n-propyl acetoacetate, isopropyl acetoacetate, n-butyl acetoacetate, sec-butyl acetoacetate, tert-butyl acetoacetate, methyl propionylacetate, ethyl propionylacetate, n-propyl propionylacetate, isopropyl propionylacetate, n-butyl propionylacetate, sec-butyl propionylacetate, tert-butyl propionylacetate, benzyl acetoacetate, dimethyl malonate, and diethyl malonate.

In the invention, other iron catalysts than iron chelate compounds may also be used. For example, a compound including a combination of iron and an alkoxy group, a halogen atom, or an acyloxy group may be used. In the compound including a combination of iron and an alkoxy group, the alkoxy group may be methoxy, ethoxy, n-propoxy, isopropoxy, n-butoxy, sec-butoxy, tert-butoxy, pentyloxy, hexyloxy, heptyloxy, octyloxy, 2-ethylhexyloxy, phenoxy, cyclohexyloxy, benzyloxy, or 1-benzylnaphthyloxy.

In the compound including a combination of iron and a halogen atom, the halogen atom may be fluorine, chlorine, bromine, iodine, or the like.

In the compound including a combination of iron and an acyloxy group, the acyloxy group may be derived from 2-ethylhexanoic acid, octanoic acid, naphthenic acid, or resin acid (such as an aliphatic organic acid based on abietic acid, neoabietic acid, d-pimaric acid, iso-d-pimaric acid, podocarpic acid, gluconic acid, fumaric acid, citric acid, asparatic acid, α-ketoglutamic acid, malic acid, succinic acid, or an amino acid such as glycine or histidine, or an aromatic fatty acid based on benzoic acid, cinnamic acid, or p-oxycinnamic acid).

In the invention, among these compounds, an iron chelate compound having a β-diketone ligand is preferably used as the catalyst (C) having an iron active center, in view of reactivity and curing properties, and in particular, tris(acetylacetonato)iron is preferably used. These compounds may be used alone or in combination of two or more as the iron catalyst (C).

In the invention, the content of the catalyst (C) having an iron active center is from 0.002 to 0.5 parts by weight, preferably from 0.003 to 0.3 parts by weight, more preferably from 0.004 to 0.2 parts by weight, based on 100 parts by weight of the acrylic polymer (A). If the content of the iron catalyst (C) is less than 0.002 parts by weight, curing properties can be insufficient, and the pressure-sensitive adhesive sheet can have too high adhesive power immediately after production, so that an adhesive residue may be more likely to occur when the pressure-sensitive adhesive sheet is peeled off. If the content of the iron catalyst (C) is more than 0.5 parts by weight, the necessary amount of the compound (D) capable of undergoing keto-enol tautomerism described below for suppressing viscosity increase can be larger, so that a liquid composition with lower temporal stability can be formed (for example, a pressure-sensitive adhesive sheet prepared using such a liquid composition cannot be cured sufficiently, even when the liquid composition is used three days after the production).

In the invention, the content of the catalyst (C) having an iron active center is preferably adjusted depending on the content of the isocyanate crosslinking agent (B). Specifically, based on the amount (weight) of the isocyanate crosslinking agent (B), the iron catalyst (C) is preferably added in an amount of 0.05 to 12.5% by weight, and more preferably in an amount of 0.075 to 7.5% by weight. If the amount of the iron catalyst (C) is less than 0.05% by weight based on the weight of the isocyanate crosslinking agent (B), curing properties can be insufficient, and the pressure-sensitive adhesive sheet can have too high adhesive power immediately after production, so that an adhesive residue may be more likely to occur when the pressure-sensitive adhesive sheet is peeled off. If the amount of the iron catalyst (C) is more than 12.5% by weight, the necessary amount of the compound (D) capable of undergoing keto-enol tautomerism described below for suppressing viscosity increase can be larger, so that a liquid composition with lower temporal stability can be formed (for example, a pressure-sensitive adhesive sheet prepared using such a liquid composition cannot be cured sufficiently, even when the liquid composition is used three days after the production).

Compound (D) Capable of Undergoing Keto-Enol Tautomerism

The pressure-sensitive adhesive composition of the invention contains a compound (D) capable of undergoing keto-enol tautomerism (hereinafter also referred to as a "keto-enol tautomeric compound (D)"). The keto-enol tautomeric compound (D) is a compound interconvertible between a keto form (ketone or aldehyde) and an enol form (see Chemical Formula 1 below). Such a compound can act as a chelating agent for the iron catalyst.

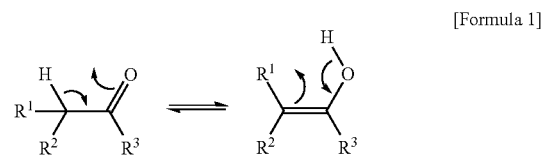

[Formula 1]

wherein $R^1$, $R^2$, and $R^3$ each represent hydrogen or a substituent, such as an alkyl group, an alkenyl group, or an aryl group. The molecule may contain a heteroatom or a halogen atom.

Examples of the compound (D) capable of undergoing keto-enol tautomerism include β-ketoesters such as methyl acetoacetate, ethyl acetoacetate, n-propyl acetoacetate, isopropyl acetoacetate, n-butyl acetoacetate, sec-butyl acetoacetate, tert-butylacetoacetate, methyl propionylacetate, ethyl propionylacetate, n-propyl propionylacetate, isopropyl propionylacetate, n-butyl propionylacetate, sec-butyl propionylacetate, tert-butyl propionylacetate, benzyl acetoacetate, dimethyl malonate, and diethyl malonate; β-diketones such as acetyl acetone, hexane-2,4-dione, heptane-2,4-dione, heptane-3,5-dione, 5-methyl-hexane-2,4-dione, octane-2,4-dione, 6-methylheptane-2,4-dione, 2,6-dimethylheptane-3,5-dione, nonane-2,4-dione, nonane-4,6-dione, 2,2,6,6-tetramethylheptane-3,5-dione, tridecane-6,8-dione, 1-phenyl-butane-1,3-dione, hexafluoroacetyl acetone, and ascorbic acid; acid anhydrides such as acetic anhydride; and ketones such as acetone, methyl ethyl ketone, methyl n-butyl ketone, methyl isobutyl ketone, methyl tert-butyl ketone, methyl phenyl ketone, and cyclohexanone. Among these compounds, β-diketones, which are highly effective in suppressing an increase in liquid composition viscosity, are preferably used, and in particular, acetyl acetone is more preferred.

The content of the compound (D) capable of undergoing keto-enol tautomerism is such that the weight ratio (D/C) of the keto-enol tautomeric compound (D) to the catalyst (C) having an iron active center is from 3 to 70, preferably such that the weight ratio (D/C) is from 5 to 50, more preferably such that the weight ratio (D/C) is from 10 to 40. If the weight ratio of the keto-enol tautomeric compound (D) to the iron catalyst (C) is more than 70, the content of the keto-enol tautomeric compound (D) can be excessive to the content of the iron catalyst (C), and the keto-enol tautomeric compound (D) can cause a side reaction with the isocyanate crosslinking agent (B) in a liquid composition, so that the number of isocyanate groups available for curing reaction with hydroxyl groups can be reduced to such a level that sufficient curing properties cannot be obtained. On the other hand, if the weight ratio of the keto-enol tautomeric compound (D) to the iron catalyst (C) is less than 3, the content of the keto-enol tautomeric compound (D) can be too low relative to the content of the iron catalyst (C), so that viscosity increase can occur because the activity of the iron catalyst (C) cannot be well suppressed in a liquid composition.

The compound (D) capable of undergoing keto-enol tautomerism should be added so that the weight ratio (D/C) of the keto-enol tautomeric compound (D) to the catalyst (C) having an iron active center is from 3 to 70. In this case, the compound (D) is preferably added in an amount of 0.15 to 5 parts by weight, and more preferably 0.2 to 4 parts by weight, based on 100 parts by weight of the acrylic polymer (A). If the added amount of the keto-enol tautomeric compound (D) is more than 5 parts by weight, a problem may occur in which a sufficient pot life cannot be obtained. If it is less than 0.15 parts by weight, viscosity increase can be suppressed, but a liquid composition with lower temporal stability can be formed (for example, a pressure-sensitive adhesive sheet prepared using such a liquid composition cannot be cured sufficiently, even when the liquid composition is used three days after the production). This seems to be because, during storage, the keto-enol tautomeric compound (D) in the liquid composition causes a side reaction with the isocyanate crosslinking agent (B) to reduce the number of isocyanate groups available for curing reaction with hydroxyl groups.

The pressure-sensitive adhesive composition of the invention may further contain other known additives. Examples of such additives include powders of colorants, pigments or the like, surfactants, plasticizers, tackifiers, low-molecular-weight polymers, surface lubricants, leveling agents, antioxidants, corrosion inhibitors, light stabilizers, ultraviolet absorbing agents, polymerization inhibitors, silane coupling agents, inorganic or organic fillers, metal powders, and particulate or flaky materials, which may be added as appropriate depending on the intended use.

The pressure-sensitive adhesive layer of the invention includes a product of crosslinking of the pressure-sensitive adhesive composition described above. The pressure-sensitive adhesive sheet of the invention includes a support and such a pressure-sensitive adhesive layer formed on the support. In this case, the pressure-sensitive adhesive composition is usually crosslinked after the application of the composition. Alternatively, however, the pressure-sensitive adhesive composition may be crosslinked, and then the pressure-sensitive adhesive layer made of the crosslinked pressure-sensitive adhesive composition may be transferred onto a support.

After crosslinking with the crosslinking agent, the pressure-sensitive adhesive layer of the invention preferably has a gel fraction of 80% by weight or more, more preferably 85% by weight or more, even more preferably 90% by weight or more (and generally 98% by weight or less). If the gel fraction is less than 80% by weight, the pressure-sensitive adhesive layer may have lower cohesive strength, which may cause the pressure-sensitive adhesive sheet to be misaligned during the fixing of an article or may easily cause an adhesive residue when the pressure-sensitive adhesive sheet is peeled off. If the gel fraction is more than 98% by weight, the acrylic polymer may have higher cohesive strength and thus lower fluidity, so that the adhesive area may be insufficient to fix an article.

The pressure-sensitive adhesive sheet of the invention may be wound to form a roll or may form a laminate. Specifically, the pressure-sensitive adhesive sheet of the invention may have any desired shape such as a sheet, a tape, or a film. Depending on the intended use, the pressure-sensitive adhesive sheet of the invention may also be cut, punched, or worked into a desired shape.

The pressure-sensitive adhesive layer may be formed on the support by any appropriate method. For example, the pressure-sensitive adhesive layer is formed on the support by a process including applying the pressure-sensitive adhesive composition to the support and removing the polymerization solvent and the like by drying. Subsequently, aging may be performed for a purpose such as control of migration of the components of the pressure-sensitive adhesive layer or control of the crosslinking reaction. When the pressure-sensitive adhesive composition is applied to the support to form a pressure-sensitive adhesive layer, one or more solvents other than the polymerization solvent may be newly added to the composition so that the composition can be uniformly applied to the support.

Known methods for the production of a pressure-sensitive adhesive sheet may also be used to form the pressure-sensitive adhesive layer of the invention. Examples of such methods include roll coating, gravure coating, reverse coating, roll brush coating, spray coating, air knife coating, etc.

The thickness of the pressure-sensitive adhesive layer of the invention is generally from about 1 μm to about 1,000 μm, and preferably from about 5 μm to about 500 μm, while it may be appropriately determined depending on the intended use. Particularly when the pressure-sensitive adhesive layer of the invention is used as a surface-protecting, pressure-sensitive adhesive sheet, the pressure-sensitive adhesive layer should be formed so as to have a thickness of about 3 μm to about 100 μm, and preferably about 5 μm to about 50 μm.

The support may be made of any material capable of being formed into a sheet or a film. For example, the support may be a polyolefin film such as a film of polyethylene, polypropylene, poly-1-butene, poly-4-methyl-1-pentene, ethylene-propylene copolymer, ethylene-1-butene copolymer, ethylene-vinyl acetate copolymer, ethylene-ethyl acrylate copolymer, or ethylene-vinyl alcohol copolymer, a polyester film such as a film of polyethylene terephthalate, polyethylene naphthalate, or polybutylene terephthalate, a polyacrylate film, a polystyrene film, a polyamide film such as a film of nylon 6, nylon 6,6, or partially aromatic polyamide, a polyvinyl chloride film, a polyvinylidene chloride film, a polycarbonate film, a polyfluoroethylene film, a polyimide film, or a polyvinyl alcohol film.

In the invention, the support generally has a thickness of about 5 μm to about 200 μm, and preferably about 10 μm to about 100 μm.

If necessary, the support may also be subjected to release and antifouling treatment with a silicone, fluoride, long-chain alkyl, or fatty acid amide release agent, silica powder, or the like; adhesion facilitating treatment such as acid treatment, alkali treatment, primer treatment, corona discharge treatment, plasma treatment, or ultraviolet treatment; or antistatic treatment such as coating-type, kneading-type, or vapor deposition-type antistatic treatment.

If necessary, a release film (separator) may be bonded to the pressure-sensitive adhesive sheet of the invention in order to protect the surface of the pressure-sensitive adhesive layer. Such a release film may be made of paper or plastic film. A plastic film is advantageously used because it has high surface smoothness. Such a film may be of any type capable of protecting the pressure-sensitive adhesive layer. Examples of such a film include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The release film generally has a thickness of about 5 μm to about 200 μm, and preferably about 10 μm to about 100 μm. If necessary, the release film may be subjected to release and antifouling treatment with a silicone, fluoride, long-chain alkyl, or fatty acid amide release agent, silica powder, or the like, or antistatic treatment such as coating-type, kneading-type, or vapor deposition-type antistatic treatment.

EXAMPLES

Hereinafter, examples and others are described to show the features and effects of the invention more specifically, but they are not intended to limit the invention. The evaluation items in the examples and so on were measured as described below.

<Measurement of Weight Average Molecular Weight of Acrylic Polymer>

A weight average molecular weight of the thus produced polymer was measured by gel permeation chromatography (GPC).

Apparatus: HLC-8220 GPC manufactured by TOSOH CORPORATION
Column:
Sample column; TSKguardcolumn Super HZ-H (one column) and TSKgel Super HZM-H (two columns), manufactured by TOSOH CORPORATION
Reference column; TSKgel Super H-RC (one column), manufactured by TOSOH CORPORATION
Flow rate: 0.6 ml/minute
Injection amount: 10 µl
Column temperature: 40° C.
Eluent: THF
Concentration of injected sample: 0.2% by weight
Detector: differential refractometer The weight average molecular weight was calculated in terms of polystyrene.

<Measurement of Gel Fraction>

A solution of the pressure-sensitive adhesive composition was applied to a polyethylene terephthalate (PET) film (38 µm in thickness) whose surface was treated with a release agent. The solvent was removed from the composition by drying at 130° C. for 30 seconds, so that a pressure-sensitive adhesive layer (25 µm in thickness) was formed. Subsequently, the pressure-sensitive adhesive layer was covered with a release film whose surface was treated with a release agent, and allowed to stand at room temperature (25° C.) for 1 hour, so that a sample for the measurement of gel fraction was obtained.

Part of the pressure-sensitive adhesive layer was taken out of the prepared sample for the measurement of gel fraction, weighed ($W_1$ g (about 0.1 g)), and immersed in ethyl acetate at about 25° C. for 1 week. After the immersion treatment, the residue of the pressure-sensitive adhesive layer was taken out of the ethyl acetate and dried at 130° C. for 2 hours. The dry weight $W_2$ g of the residue was then measured and used for the calculation of the gel fraction=$(W_2/W_1) \times 100$ (%).

<Measurement of Viscosity>

The viscosity of the liquid pressure-sensitive adhesive composition was measured using a BH viscometer under the conditions of rotor No. 3, a rotational speed of 20 rpm, a liquid temperature of 25° C., and a measurement time period of 1 minute. The measurement was performed 1 hour, 24 hours, and 48 hours after the preparation, respectively.

◯: The viscosity is 2.0 Pa·s or less.
Δ: The viscosity is higher than 2.0 Pa·s and lower than 5.0 Pa·s.
×: The viscosity is higher than 5.0 Pa·s.

<Preparation of Pressure-Sensitive Adhesive Sheet to be Evaluated>

The pressure-sensitive adhesive composition solution was applied to a polyethylene terephthalate (PET) film (38 µm in thickness) immediately after preparation and after storage at room temperature (25° C.) for 3 days. The solvent was removed from the composition solution by drying at 130° C. for 30 seconds, so that a pressure-sensitive adhesive layer (25 µm in thickness) was formed. Subsequently, the pressure-sensitive adhesive layer was covered with a release film whose surface was treated with a release agent, and allowed to stand at room temperature (25° C.) for 1 hour, so that a surface protecting film to be evaluated was obtained.

<Measurement of Adhesive Strength>

Each prepared pressure-sensitive adhesive sheet to be evaluated was cut into a piece with a size of 100 mm long×25 mm wide. A SUS 430 BA plate was cleaned by rubbing it 10 times with a clean waste impregnated with isopropyl alcohol. The cut piece was press-bonded to the cleaned SUS 430 BA plate with a 2 kg rotating roller reciprocating once on the cut piece, so that a sample to be evaluated for adhesive strength was obtained. The sample to be evaluated was allowed to stand in a measurement environment at 23° C. and 50% RH for 30 minutes, and then the adhesive strength [N/25 mm] of the cut piece was measured using a high-speed peeling tester under the conditions of a peel rate of 30 m/minute and a peel angle of 180°.

[Preparation of Acrylic Polymer]

To a four-neck flask equipped with a stirring blade, a thermometer, a nitrogen gas introducing tube, a condenser, and a dropping funnel were added 96 parts by weight of 2-ethylhexyl acrylate (2EHA), 4 parts by weight of 2-hydroxyethyl acrylate (HEA), 0.2 parts by weight of azobisisobutyronitrile as a polymerization initiator, and 356 parts by weight of ethyl acetate. Under gentle stirring, nitrogen gas was introduced into the flask, and the mixture was subjected to a polymerization reaction for about 3 hours while the temperature of the liquid in the flask was kept at about 60° C., so that a (meth) acrylic polymer solution was obtained. The resulting (meth) acrylic polymer had a weight average molecular weight of 480,000, and a glass transition temperature of −35° C. as calculated from the FOX equation.

[Preparation of Pressure-Sensitive Adhesive Sheet using the Pressure-Sensitive Adhesive Composition]

Example 1

Based on 100 parts by weight (solid basis) of the acrylic polymer, 4 parts by weight of a trimethylolpropane-tolylene diisocyanate trimer adduct (CORONATE L (tradename) manufactured by NIPPON POLYURETHANE INDUSTRY CO., LTD.) as a crosslinking agent and 0.1 parts by weight of tris(acetylacetonato)iron (NACEM Ferric Ion (trade name) manufactured by NIHON KAGAKU SANGYO CO., LTD.) as an iron catalyst, and 2.5 parts by weight of acetyl acetone (AcAc) were added to the acrylic polymer solution. The mixture was further diluted with toluene to a solid concentration of 29% by weight, and then stirred, so that a pressure-sensitive adhesive composition was obtained. Using this composition, the sample for the measurement of gel fraction and the pressure-sensitive adhesive sheet to be evaluated were prepared according to the preparation methods described above.

Examples 2 to 4 and Comparative Examples 1 to 4

According to the formulation shown in Table 1, each pressure-sensitive adhesive composition and each pressure-sensitive adhesive sheet were prepared using the same procedure as in Example 1.

In the table, C/HX for crosslinking agent represents an isocyanurate of hexamethylene diisocyanate (CORONATE HX (trade name) manufactured by NIPPON POLYURETHANE INDUSTRY CO., LTD.), and OL-1 for catalyst represents dioctyltin dilaurate (EMBILIZER OL-1, manufactured by Tokyo Fine Chemical CO., LTD.).

TABLE 1

| | Pressure-sensitive adhesive composition formulation | | | | | | | | Viscosity [Pa·s] | | | Gel fraction [%] | | Adhesive strength [N/25 mm] | |
| | Acrylic polymer (A) | | Crosslinking agent (B) | | Catalyst (C) | | AcAc (D) | | | | | Immediately after preparation | After 3 days | Immediately after preparation | After 3 days |
| | Type | Amount | Type | Amount | Type | Amount | Amount | D/C | 1 h | 24 h | 48 h | | | | |
|---|---|---|---|---|---|---|---|---|---|---|---|---|---|---|---|
| Example 1 | 2EHA/HEA = 96/4 | 100 | C/L | 4 | NACEM Ferric Ion | 0.1 | 2.5 | 25 | 0.6 (O) | 0.6 (O) | 0.6 (O) | 95 | 94 | 3.7 | 4.0 |
| Example 2 | | | | | | 0.02 | 0.5 | 25 | 0.6 (O) | 0.6 (O) | 0.6 (O) | 93 | 92 | 5.9 | 7.7 |
| Example 3 | | | C/HX | | | 0.1 | 2.5 | 25 | 0.6 (O) | 0.6 (O) | 0.6 (O) | 95 | 95 | 2.4 | 2.6 |
| Example 4 | | | C/L | | | 0.005 | 0.2 | 40 | 0.6 (O) | 0.6 (O) | 0.6 (O) | 93 | 91 | 5.3 | 8.1 |
| Comparative Example 1 | | | | | | 0.001 | 0.03 | 30 | 0.6 (O) | 0.6 (O) | 0.6 (O) | 65 | 65 | 20.4 | 20.4 |
| Comparative Example 2 | | | | | | 0.1 | 25.5 | 255 | 0.6 (O) | 0.6 (O) | 0.6 (O) | 94 | 75 | 4.2 | 18.5 |
| Comparative Example 3 | | | | | | 0.1 | 0.03 | 0.3 | 0.6 (O) | 5 or more (x) | 5 or more (x) | 95 | gel | 3.6 | gel |
| Comparative Example 4 | | | | | OL-1 | 0.1 | 25.5 | 255 | 0.6 (O) | 2.2 (Δ) | 5 or more (x) | 93 | gel | 6.7 | gel |

In the table, "gel" indicates that the pressure-sensitive adhesive composition showed gelation.

Table 1 shows that the pressure-sensitive adhesive composition of each of Examples 1 to 4 did not increase in viscosity even 48 hours after the preparation of the composition and had a stable pot life. Table 1 also shows that there was no change in the gel fraction of the pressure-sensitive adhesive layer or in the adhesive strength of the pressure-sensitive adhesive sheet between immediately after the preparation using the pressure-sensitive adhesive composition of each of Examples 1 to 4 and three days after the preparation, and thus the pressure-sensitive adhesive composition of each of Examples 1 to 4 also had stable properties.

On the other hand, it has been demonstrated that the pressure-sensitive adhesive composition of Comparative Example 1 has the problem that it cannot be sufficiently crosslinked because the content of the catalyst (C) having an iron active center is relatively low. The pressure-sensitive adhesive composition of Comparative Example 2 had low temporal stability and was not sufficiently crosslinked 3 days after the preparation because the weight ratio of the compound (D) capable of undergoing keto-enol tautomerism to the iron catalyst (C) was too high, namely, the content of the keto-enol tautomeric compound (D) was too high.

The pressure-sensitive adhesive composition of Comparative Example 3 did not have a satisfactory pot life and showed gelation only three days after the preparation because the weight ratio of the compound (D) capable of undergoing keto-enol tautomerism to the catalyst (C) having an iron active center was too low, namely, the content of the keto-enol tautomeric compound (D) was too low. Thus, it was not possible to make a pressure-sensitive adhesive sheet. In Comparative Example 4 using a tin-based catalyst, crosslinking proceeded during the storage of the pressure-sensitive adhesive composition, despite the addition of the keto-enol tautomeric compound (D) in the same amount as in Comparative Example 2, and the liquid composition showed gelation three days after the preparation. Thus, it was not possible to make a pressure-sensitive adhesive sheet.

What is claimed is:

1. A pressure-sensitive adhesive composition, comprising:
    100 parts by weight of an acrylic polymer (A) having an active hydrogen-containing functional group;
    0.1 parts by weight to 10 parts by weight of an isocyanate crosslinking agent (B);
    0.002 parts by weight to 0.5 parts by weight of a catalyst (C) having an iron active center; and
    a compound (D) capable of undergoing keto-enol tautomerism, wherein
    the weight ratio (D/C) of the compound (D) capable of undergoing keto-enol tautomerism to the catalyst (C) having an iron active center is from 3 to 70.

2. The pressure-sensitive adhesive composition according to claim 1, wherein the acrylic polymer (A) having an active hydrogen-containing functional group comprises, as monomer components, 70% by weight to 99.9% by weight of an alkyl (meth)acrylate having an alkyl group of 4 to 12 carbon atoms and 0.1% by weight to 30% by weight of a monomer having an active hydrogen-containing functional group.

3. The pressure-sensitive adhesive composition according to claim 1, wherein the catalyst (C) having an iron active center is an iron chelate compound.

4. The pressure-sensitive adhesive composition according to claim 1, wherein the compound (D) capable of undergoing keto-enol tautomerism is a β-diketone.

5. The pressure-sensitive adhesive composition according to claim 1, which has a gel fraction of 80% or more after crosslinked.

6. A pressure-sensitive adhesive layer comprising a product of crosslinking of the pressure-sensitive adhesive composition according to claim 1.

7. A pressure-sensitive adhesive sheet comprising a support and the pressure-sensitive adhesive layer according to claim 6 formed on the support.

8. A pressure-sensitive adhesive layer comprising a product of crosslinking of the pressure-sensitive adhesive composition according to claim 5.

9. A pressure-sensitive adhesive sheet comprising a support and the pressure-sensitive adhesive layer according to claim 8 formed on the support.

10. The pressure-sensitive adhesive composition according to claim 1, wherein the viscosity of the pressure-sensitive adhesive composition is 2.0 Pa·s or less.

11. The pressure-sensitive adhesive composition according to claim 1, wherein the viscosity of the pressure-sensitive adhesive composition is 2.0 Pa·s or less 48 hours after the preparation of the pressure-sensitive adhesive composition.

12. The pressure-sensitive adhesive composition according to claim 1, which has a gel fraction of 80% or more after crosslinking with a crosslinking agent, and wherein there is no change in the gel fraction during the time period starting immediately after preparation and ending three days after preparation.

13. The pressure-sensitive adhesive composition according to claim 1, the weight ratio (D/C) of the compound (D) capable of undergoing keto-enol tautomerism to the catalyst (C) having an iron active center is from 3 to 40.

* * * * *